United States Patent [19]

Yanagi et al.

[11] Patent Number: 5,631,309
[45] Date of Patent: May 20, 1997

[54] AQUEOUS INKS FOR INK JET RECORDING

[75] Inventors: Hideki Yanagi; Kouichi Sakai; Masayoshi Nawa; Koichi Nakamura, all of Tochigi-ken, Japan

[73] Assignee: Kao Corporation, Tokyo, Japan

[21] Appl. No.: 521,327

[22] Filed: Aug. 30, 1995

[30] Foreign Application Priority Data

Aug. 31, 1994 [JP] Japan .................. 6-207620

[51] Int. Cl.$^6$ .................. C03C 17/00; C09D 5/00; B41F 31/00
[52] U.S. Cl. ............. 523/160; 101/491; 101/DIG. 37; 523/161
[58] Field of Search .................. 523/161, 160; 101/DIG. 37, 491

[56] References Cited

U.S. PATENT DOCUMENTS

| | | | |
|---|---|---|---|
| 4,260,531 | 4/1981 | Wachtel et al. | 260/29.6 |
| 4,597,794 | 7/1986 | Ohta et al. | 523/160 |
| 5,284,894 | 2/1994 | Wasyliw et al. | 524/377 |
| 5,334,649 | 8/1994 | Fujita | 523/160 |
| 5,536,761 | 7/1996 | Fujita | 523/160 |
| 5,539,038 | 7/1996 | Katsen et al. | 523/160 |

OTHER PUBLICATIONS

Kirk–Othmer Encyclopedia of Chemical Technology —4th edition, pp. 542–548, John Wiley and Sons (1993).

*Primary Examiner*—Veronica P. Hoke
*Attorney, Agent, or Firm*—Oblon, Spivak, McClelland, Maier & Neustadt, P.C.

[57] ABSTRACT

An aqueous ink for ink jet recording comprises a dye and a polymeric compound which can undergo a decarboxylation reaction. In an ink jet recording method, a recording operation is carried out by jetting a liquid droplet of the ink from a nozzle to a recording medium by using thermal energy.

4 Claims, No Drawings

AQUEOUS INKS FOR INK JET RECORDING

BACKGROUND OF THE INVENTION

1. Field of the Invention

This invention relates to an aqueous ink for ink jet recording. This invention particularly relates to an aqueous ink for ink jet recording, which does not scorch and stick to printing heads of ink jet printers and is capable of producing water-resistant images. This invention also relates to an ink jet recording method, in which the aqueous ink for ink jet recording is used.

2. Description of the Related Art

With ink jet recording systems, small droplets of an ink are directly jetted from a very small nozzle and caused to adhere to a recording medium, and images including characters are thereby produced on the recording medium. The ink jet recording systems have advantages in that the printing apparatus used produces less noise and have better operability, in that color images can be obtained easily, and in that plain paper can be used as a recording medium. Therefore, the ink jet recording systems have heretofore been used widely. Techniques for jetting the inks include, for example, piezo-electric techniques, which utilize piezo-electric devices for the printing heads, and thermal jet techniques which utilize heating resistor elements for the printing heads. Printers utilizing such techniques have heretofore been widely accepted in personal end use.

In order for the nozzles to be prevented from being clogged with inks, water-soluble dyes are conventionally used as the inks for ink jet printers. In cases where water-soluble dyes are used, the nozzles suffer from little clogging. However, the problems occur in that the water resistance of the obtained images cannot be kept high. Also, in cases where the thermal jet techniques are utilized, the problems occur in that the dyes undergo oxidation due to excessive amount of heat, and the inks are apt to scorch and stick to the printing heads.

With the thermal jet techniques, a heating resistor element is incorporated in the printing head, and the recording operation is carried out by boiling an ink with thermal energy generated by the heating resistor element to produce bubbles, and jetting small droplets of the ink by the action of the pressure of the resulting bubbles. Therefore, when the ink is heated and boiled on the heater, dyes contained in the ink often deteriorate and decompose. As a result, insoluble substances thus formed stick to the printing head and cause the printing head to be clogged. Accordingly, the composition of the ink is of great importance for preventing such clogging of the printing head.

Various attempts have heretofore been made to prevent an ink from scorching and sticking to a printing head. For example, a technique for utilizing an ink containing an organic sulfonate has been proposed in, for example, Japanese Patent Application Laid-open 4-227669. Also, a technique for utilizing an ink containing a dye having a specific structure has been proposed in, for example, U.S. Pat. No. 5,062,893. Further, a technique for utilizing an ink containing a salt of bile acid has been proposed in, for example, U.S. Pat. No. 5,108,501. However, none of the conventional techniques could achieve sufficient effects.

Also, various attempts have heretofore been made to improve the water resistance of printed images. For example, techniques for utilizing pigments as an ink have been proposed in, for example, Japanese Patent Application Laid-opens 4-28776, 4-189876, 4-359071, and 4-359072. Also, a technique for utilizing a non-aqueous liquid medium has been proposed in, for example, Japanese Patent Application Laid-opens 4-261478. Further, a technique for utilizing a dye having a high water resistance has been proposed in, for example, U.S. Pat. No. 4,963,189. However, if a pigment is used as an ink, the problems will occur in that the saturation of printed images cannot be kept high. Also, none of the other conventional techniques described above could substantially solve the problems with regard to the improvement in the water resistance.

Further, no ink has heretofore been proposed which can satisfy the two requirements described above in a well-balanced manner.

SUMMARY OF THE INVENTION

It is therefore an object of the present invention to provide an aqueous ink for ink jet recording, which does not scorch and stick to printing heads of ink jet printers and is capable of producing water-resistant images.

Another object of the present invention is to provide an ink jet recording method, in which the aqueous ink for ink jet recording is used.

The inventors carried out extensive research and found that the objects described above can be achieved by incorporating a dye and a polymeric compound which can undergo decarboxylation reaction into an aqueous ink for ink jet recording. The present invention is based on such findings.

Specifically, the present invention provides an aqueous ink for ink jet recording comprising a dye and a polymeric compound which can undergo a decarboxylation reaction.

The present invention also provides an ink jet recording method comprising jetting (expelling) the aqueous ink for ink jet recording according to the present invention in a droplet form from a nozzle to a recording medium by the action of thermal energy, thereby producing an image on the recording medium.

The aqueous ink for ink jet recording in accordance with the present invention does not scorch and stick to printing heads of ink jet printers and can produce images having a high water resistance and high line marker resistance. Also, with the ink jet recording method in accordance with the present invention, in particular, in cases where the aqueous ink for ink jet recording in accordance with the present invention is used for a thermal jet technique, which utilizes thermal energy of a heating resistor element, the ink can be prevented from scorching and sticking to the printing head due to excessive amount of heat.

DETAILED DESCRIPTION OF THE INVENTION

The polymeric compound, which is contained in the aqueous ink for ink jet recording in accordance with the present invention, can undergo the decarboxylation reaction at high temperatures. The polymeric compound preferably have a hydrophilic moiety which can undergo the decarboxylation reaction, and a hydrophobic moiety. The polymeric compound is more preferably a copolymer of a monomer having a hydrophilic moiety which can undergo the decarboxylation reaction, and a monomer having a hydrophobic moiety. The hydrophilic moieties, which can undergo the decarboxylation reaction at high temperatures, include, for example, a carbonyl group, a ketene group, a carboxyl group, an acyl group, and an acetyl group. For easiness of the decarboxylation reaction, the hydrophilic moiety is preferably a ketene group or a carboxyl group. Monomers having such hydrophilic moieties include, for example, maleic anhydride; and acrylic acid, methacrylic acid, and esters thereof, which are represented by the general formula $CH_2=CR_1(C=O)R_2R_3$. For easiness of the decarboxylation reaction, the monomer having a hydrophilic moiety is preferably maleic anhydride or methyl methacrylate. The hydrophobic moieties include, for example, a saturated hydrocarbon group and an unsaturated hydrocarbon group. From the viewpoint of a high-temperature resistance, the hydrophobic moiety is preferably benzene or a derivative moiety thereof, or a saturated hydrocarbon group. Monomers having such hydrophobic moieties include, for example, the compounds represented by the general formula $CH_2=CR_4R_5$, such as styrene, p-methylstyrene, p-chlorostyrene, ethylene, propylene, and isobutene. From the viewpoint of a high-temperature resistance, the monomer having a hydrophobic moiety is preferably styrene, p-methylstyrene, or p-chlorostyrene. The copolymer obtained from the monomers described above may be any of alternating copolymers, block copolymers, random copolymers, and graft copolymers. In particular, alternating copolymers are preferred. The copolymers include, for example, a (styrene-maleic anhydride) copolymer, a (styrene-maleic acid) copolymer and a salt thereof, a (styrene derivative-maleic acid) copolymer and a salt thereof, a (styrene-maleic acid derivative) copolymer and a salt thereof, a (vinyl acetate-maleic acid) copolymer and a salt thereof, an (acrylamide-maleic anhydride-styrene) copolymer, a (methyl β-naphthyl ketone oxime acrylate-styrene) copolymer, a (benzophenone oxime acrylate-styrene) copolymer, an (o-acryloylacetophenone oxime-styrene) copolymer, and an (o-methacryloylacetophenone oxime-styrene) copolymer.

A particularly preferred polymeric compound which can undergo the decarboxylation reaction comprises the following recurring unit (I):

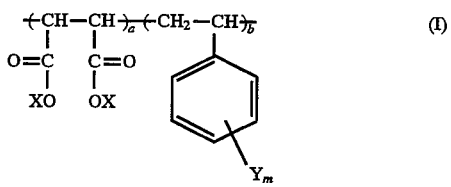

wherein X independently represents a hydrogen atom, an alkali metal ion, an ammonium ion, or a substituted or unsubstituted alkylamine; Y independently represents a substituted or unsubstituted alkyl group, a substituted or unsubstituted alkoxy group, a substituted or unsubstituted aryl group, a substituted or unsubstituted aryloxy group, a carboxyl group, an acyl group, a hydroxyl group, an amino group, a nitro group, a sulfonyl group, a sulfinyl group, or a halogen atom; and m represents an integer of 0 to 5.

In the recurring unit (I), X independently represents a hydrogen atom; an alkali metal ion, such as a sodium ion or a potassium ion; an ammonium ion; or a substituted or unsubstituted alkylamine, such as triethylamine, diethanolamine, or triethanolamine. It is preferred that X independently represents an alkali metal ion or an ammonium ion. Also, Y independently represents a substituted or unsubstituted alkyl group, a substituted or unsubstituted alkoxy group, a substituted or unsubstituted aryl group, a substituted or unsubstituted aryloxy group, a carboxyl group, an acyl group, a hydroxyl group, an amino group, a nitro group, a sulfonyl group, a sulfinyl group, or a halogen atom. Among them, it is preferred that Y independently represents a substituted or unsubstituted alkyl group. Further, m represents an integer of 0 to 5, and preferably an integer of 0 to 2. In particular, in cases where m represents 1, Y should preferably be present at the para-position. The polymeric compounds, which are most preferably used in the present invention, include a (styrene-maleic acid) alternating copolymer, a (p-methylstyrene-maleic acid) alternating copolymer, a (p-chlorostyrene-maleic acid) alternating copolymer, and salts of these alternating copolymers.

The above-enumerated polymeric compounds, which can undergo the decarboxylation reaction, may be used alone, or two or more of them may be used in combination. Also, in order to improve the dye dispersibility, any of dispersing agents, which are conventionally employed, may be added to the aqueous ink for ink jet recording in accordance with the present invention.

The polymeric compound, which is used in the aqueous ink for ink jet recording in accordance with the present invention, can undergo the decarboxylation reaction at high temperatures. The temperature, at which the decarboxylation reaction of the polymeric compound occurs, is preferably 150° to 500° C., and more preferably 200° to 400° C. In cases where the temperature, at which the decarboxylation reaction of the polymeric compound occurs, falls within the range described above, it is advantageous that the storage stability of the ink can be kept high, and the scorching and sticking of the ink to the printing head during the printing process can be prevented. Also, the molecular weight of the polymeric compound is preferably 1,000 to 10,000, and more preferably 1,500 to 5,000. In cases where the molecular weight of the polymeric compound falls within the range described above, it is advantageous that the water resistance of the printed image can be kept high, and the scorching and sticking of the ink to the printing head during the printing process can be prevented.

In the present invention, the temperature, at which the decarboxylation reaction of the polymeric compound occurs, is measured in the manner described below. Specifically, a (differential scanning calorimetry-thermogravimetric) simultaneous measuring apparatus (DSC-TGA) is used, and the temperature at which carbon dioxide is detected is taken as the temperature at which the decarboxylation reaction of the polymeric compound has occurred.

Also, the molecular weight of the polymeric compound is determined in the manner described below. Specifically, gel permeation chromatography (GPC) is utilized, and the molecular weight is determined by making a comparison with a standard sample.

The polymeric compound, which is used in the aqueous ink for ink jet recording in accordance with the present invention, can be obtained by, for example, copolymerizing a monomer having a hydrophilic moiety which can undergo the decarboxylation reaction, and a monomer having a hydrophobic moiety. No limitation is imposed on how the copolymerization is carried out, and any of conventional processes for copolymerization can be used. For example, the polymeric compound comprising the recurring unit (I) can be obtained by copolymerizing styrene or a styrene derivative and maleic acid or a maleic acid derivative. No limitation is imposed on how they are copolymerized, and any of conventional processes for copolymerization can be used. For example, the polymeric compound comprising the recurring unit (I) can be obtained by polymerizing styrene and maleic acid in the presence of azobisisobutyronitrile at a temperature of 70° C. and in a nitrogen gas stream. In order for the molecular weight to be adjusted, the polymerization time and the amount of an polymerization initiator may be adjusted appropriately.

As described above, the aqueous ink for ink jet recording in accordance with the present invention, which comprises the dye and the polymeric compound which can undergo the decarboxylation reaction, does not scorch and stick to a printing head and can produce water-resistant images. The reasons why such advantageous effects can be obtained have not yet been clarified completely. However, it is considered that the advantageous effects of the present invention can be presumably obtained for the reasons described below. Specifically, because the polymeric compound has the hydrophilic moiety and the hydrophobic moiety, the dye is present in water medium such that the dye may be included in the polymeric compound. While the ink is exposed to a temperature as high as approximately 700° C. at a printing head, excessive heat generated at the printing head is consumed as heat of reaction required for the hydrophilic moiety in the polymeric compound to undergo the decarboxylation reaction (i.e., the reaction for generating carbon dioxide by the decomposition of the hydrophilic moiety), instead of the dye being oxidized due to excessive heat of the printing head, because the dye is included in the polymeric compound. Therefore, it is considered that, for these reasons, the scorching and sticking of the ink to the printing head can be reduced. As a result of the dissipation of the hydrophilic moiety in the polymeric compound due to the decarboxylation reaction, the inherent properties of the polymeric compound change drastically, and a polymeric compound having a high water resistance is formed. Accordingly, it is considered that, when the dye adheres to a recording medium, the polymeric compound thus formed serves as a binder, which imparts the water resistance to the dye. The term "thermal decomposition of a polymeric compound" as used herein means that the side chain and/or the main chain of the polymeric compound is cut due to the action of heat, and another polymeric compound having the other structure is thereby formed.

In the aqueous ink for ink jet recording in accordance with the present invention, any dye such as oil-soluble dye, disperse dye, direct dye, and water-soluble dye can be used.

The oil-soluble dyes, which may be used, include, for example, C. I. Solvent Black 3; C. I. Solvent Yellow 19; C. I. Solvent Red 8, C. I. Solvent Red 24, C. I. Solvent Red 43, C. I. Solvent Red 51, C. I. Solvent Red 72, and C. I. Solvent Red 73; C. I. Solvent Violet 3; C. I. Solvent Blue 2 and C. I. Solvent Blue 11; C. I. Solvent Green 3 and C. I. Solvent Green 7; and C. I. Solvent Orange 2.

The disperse dyes, which may be used, include, for example, C. I. Disperse Yellow 3, C. I. Disperse Yellow 5, C. I. Disperse Yellow 56, C. I. Disperse Yellow 60, and C. I. Disperse Yellow 64; C. I. Disperse Red 4, C. I. Disperse Red 5, C. I. Disperse Red 60, C. I. Disperse Red 72, C. I. Disperse Red 73, and C. I. Disperse Red 91; C. I. Disperse Violet 26; C. I. Disperse Blue 3, C. I. Disperse Blue 7, C. I. Disperse Blue 56, C. I. Disperse Blue 60, and C. I. Disperse Blue 79; and C. I. Disperse Orange 13 and C. I. Disperse Orange 30.

The direct dyes, which may be used, include, for example, C. I. Direct Black 17 and C. I. Direct Black 19; C. I. Direct Yellow 44; C. I. Direct Red 23 and C. I. Direct Red 79; C. I. Direct Blue 15, C. I. Direct Blue 71, C. I. Direct Blue 86, and C. I. Direct Blue 168; C. I. Direct Green 59; and C. I. Direct Orange 26.

Acid dyes, which may be used, include, for example, C. I. Acid Black 2 and C. I. Acid Black 52; C. I. Acid Yellow 23; C. I. Acid Red 51, C. I. Acid Red 87, and C. I. Acid Red 92; and C. I. Acid Blue 1, C. I. Acid Blue 9, and C. I. Acid Blue 74.

Basic dyes, which may be used, include, for example, C. I. Basic Yellow 2 and C. I. Basic Yellow 11; C. I. Basic Red 1 and C. I. Basic Red 13; C. I. Basic Violet 1, C. I. Basic Violet 3, C. I. Basic Violet 7, and C. I. Basic Violet 10; and C. I. Basic Blue 5, C. I. Basic Blue 7, C. I. Basic Blue 9, and C. I. Basic Blue 26.

In the present invention, the oily dye, the disperse dye, or the direct dye is preferably used as the dye.

The aqueous ink for ink jet recording in accordance with the present invention contains water as a medium and also contains the dye and the polymeric compound which can undergo the decarboxylation reaction. The aqueous ink for ink jet recording in accordance with the present invention may further contain any of various known additives, for example, a humectant, such as a polyhydric alcohol, a mildew-proofing agent, and/or a chelating agent. The humectants, which may be used, include, for example, polyhydric alcohols and their ethers, such as ethylene glycol, propylene glycol, diethylene glycol, triethylene glycol, polyethylene glycol, glycerin, diethylene glycol diethyl ether, and diethylene glycol mono-n-butyl ether; acetates; and nitrogen-containing compounds, such as N-methyl-2-pyrrolidone and 1,3-dimethyl imidazolidinone. These wetting agents may be used alone, or two or more of them may be used in combination.

No limitation is imposed on the proportions of each component which comprises the aqueous ink for ink jet recording in accordance with the present invention. In general, the proportion of the dye is 0.5 to 10% by weight, based on the total weight of the ink. The proportion of the polymeric compound which can undergo the decarboxylation reaction, is generally 0.1 to 20% by weight, based on the total weight of the ink. The proportion of water is generally 60 to 95% by weight, based on the total weight of the ink. The proportion of the other components is generally 0.1 to 20% by weight, based on the total weight of the ink. The proportion of the dye is preferably 0.7 to 7% by weight, based on the total weight of the ink. The proportion of the polymeric compound which can undergo the decarboxylation reaction is preferably 0.5 to 10% by weight, based on the total weight of the ink. The proportion of water is preferably 70 to 90% by weight, based on the total weight of the ink. The proportion of the other components is preferably 0.1 to 15% by weight, based on the total weight of the ink. The weight ratio of the dye to the polymeric compound which can undergo the decarboxylation reaction is generally between 0.25:1 and 10:1, and is preferably between 0.5:1 and 5:1.

No limitation is imposed on how the aqueous ink for ink jet recording in accordance with the present invention is mixed. The components may be mixed together by using any of known mixing apparatuses, such as a ball mill, an attritor, a basket mill, and a roll mill.

The aqueous ink for ink jet recording in accordance with the present invention can be used for any of the piezoelectric type ink jet printers and the thermal jet type ink jet printers. As will be clear from Examples, which will be described later, excellent effects of reduction in the scorching and sticking of the ink to the printing head can be obtained particularly when the aqueous ink for ink jet recording in accordance with the present invention is used for the thermal jet type ink jet recording printers. In particular, the aqueous ink for ink jet recording in accordance with the present invention exhibits very advantageous effects in cases where a heating resistor element is used to produce thermal energy for the thermal jet type ink jet recording printers.

EXAMPLES

The present invention will hereinbelow be further illustrated by the following nonlimitative examples. In the examples described below, all the parts described in the Examples mean parts by weight unless otherwise specified. The molecular weight of polymeric compounds was measured by using GPC (HLC-8020) supplied by Toso Corporation and determined by making a comparison with a standard polystyrene. The temperature at which the decarboxylation reaction of the polymeric compound occurs was measured in a nitrogen gas stream and at a temperature increase rate of 2° C./minute by using a (SSC5000 Series) differential scanning calorimetry-thermogravimetric simultaneous measuring apparatus TG-DTA200 supplied by Seiko Instruments Inc.

Example 1

C. I. Solvent Black 3; 7 parts
Na salt of vinyl acetate-maleic acid copolymer (molecular weight; 3,000, decarboxylation temperature; 30° C.); 7 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained. In Table 1, the scorching and sticking to the printing head were judged by applying 2,000,000 pulses to the printing head and thereafter observing the state of the scorching and sticking to printing head by a microscope. As for the water resistance, 0.3 ml of a water droplet was dropped to the printed image. After one minute, the water droplet was wiped off, and the state of blotting of the printed image and the state of rubbing-off of the printed image were visually judged.

Example 2

C. I. Solvent Black 3; 5 parts
Ammonium salt of styrene-acrylic acid copolymer (molecular weight; 1,500, decarboxylation temperature; 230° C.); 5 parts
Diethylene glycol; 5 parts
Water; 85 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained.

Example 3

C. I. Direct Black 19; 5 parts
Na salt of p-methylstyrene-maleic acid copolymer (molecular weight; 2,500, decarboxylation temperature; 250° C.); 5 parts
Glycerin; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained.

Example 4

C. I. Acid Red 51; 5 parts
p-Chlorostyrene-methacrylic acid copolymer (molecular weight; 2,200, decarboxylation temperature; 300° C.); 5 parts
Diethylene glycol; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained.

Example 5

C. I. Solvent Black 3; 5 parts
Na salt of styrene-maleic acid copolymer (molecular weight; 20,000, decarboxylation temperature; 230° C.); 5 parts
Glycerin; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained.

Example 6

C. I. Solvent Black 3; 5 parts
Ammonium salt of p-methylstyrene-maleic acid copolymer (molecular weight; 600, decarboxylation temperature; 250° C.); 5 parts
Glycerin; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained.

Comparative Example 1

Carbon black; 6 parts
Na salt of vinyl acetate-maleic acid copolymer (molecular weight; 3,000, decarboxylation temperature; 230° C.); 6 parts
Glycerin; 6 parts
Water; 82 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained.

Comparative Example 2

C. I. Solvent Black 3; 5 parts
Na salt of formalin condensate of naphthalenesulfonic acid (molecular weight; 20,000, reaction; 5 parts
Glycerin; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained.

TABLE 1

| | Scorching and Sticking to Printing Head | Water Resistance | |
| --- | --- | --- | --- |
| | | Blotting | Rubbing-off |
| Examples | | | |
| 1 | Not observed | Not observed | Not observed |
| 2 | Not observed | Not observed | Not observed |
| 3 | Not observed | Not observed | Not observed |
| 4 | Not observed | Not observed | Not observed |
| 5 | Very slightly observed (acceptable from the viewpoint of performance) | Not observed | Not observed |
| 6 | Not observed | Not observed | Very slightly observed (acceptable from the viewpoint of performance) |
| Comparative Examples | | | |
| 1 | Observed | Slightly observed | Slightly observed |
| 2 | Observed | Observed | Observed |

Example 7

C. I. Solvent Blue 2; 5 parts
Styrene-maleic acid copolymer (molecular weight; 1,500, decarboxylation temperature; 230° C.); 5 parts
Diethylene glycol; 5 parts
Water; 85 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 2 were obtained.

Example 8

C. I. Solvent Black 3; 5 parts
Na salt of p-methylstyrene-maleic acid copolymer (molecular weight; 2,500, decarboxylation temperature; 250° C.); 5 parts
Glycerin; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 2 were obtained.

Example 9

C. I. Solvent Red 51; 5 parts
Ammonium salt (of p-chlorostyrene-maleic acid) copolymer (molecular weight; 2,200, decarboxylation temperature; 300° C.); 5 parts
Diethylene glycol; 5 parts
Water; 85 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 1 were obtained.

Comparative Example 3

Carbon black; 6 parts
Styrene-maleic acid copolymer (molecular weight; 2,000, decarboxylation temperature; 230° C.); 6 parts
Glycerin; 6 parts
Water; 82 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 2 were obtained.

TABLE 2

| | Scorching and Sticking to Printing Head | Water Resistance | |
| --- | --- | --- | --- |
| | | Blotting | Rubbing-off |
| Examples | | | |
| 7 | Not observed | Not observed | Not observed |
| 8 | Not observed | Not observed | Not observed |
| 9 | Not observed | Not observed | Not observed |
| Comparative Example | | | |
| 3 | Observed | Slightly observed | Slightly observed |

Example 10

C. I. Disperse Blue 3; 5 parts
Styrene-maleic acid copolymer (molecular weight; 1,500, decarboxylation temperature; 230° C.); 5 parts
Diethylene glycol; 5 parts
Water; 85 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 3 were obtained. y

Example 11

C. I. Disperse Red 4; 5 parts
Na salt of p-methylstyrene-maleic acid copolymer (molecular weight; 2,500, decarboxylation temperature; 250° C.); 5 parts
Glycerin; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro- Bubble Jet printer (Type No. BJ-550 supplied by Canon Inc.), and the results shown in Table 3 were obtained.

Example 12

C. I. Disperse Violet 26; 5 parts
Ammonium salt of p-chlorostyrene-maleic acid copolymer (molecular weight; 2,200, decarboxylation temperature; 300° C.); 5 parts
Diethylene glycol; 5 parts
Water; 85 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 3 were obtained.

Comparative Example 4

C. I. Disperse Blue 60; 5 parts
Na salt of formalin condensate of naphthalenesulfonic acid (molecular weight; 20,000; 5 parts
Glycerin; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 3 were obtained.

TABLE 3

| | Scorching and Sticking | Water Resistance | |
| --- | --- | --- | --- |
| | to Printing Head | Blotting | Rubbing-off |
| Examples | | | |
| 10 | Not observed | Not observed | Not observed |
| 11 | Not observed | Not observed | Not observed |
| 12 | Not observed | Not observed | Not observed |
| Comparative Example | | | |
| 4 | Observed | Observed | Observed |

Example 13

C. I. Direct Black 17; 5 parts
Styrene-maleic acid copolymer (molecular weight; 1,500, decarboxylation temperature; 230° C.); 5 parts
Diethylene glycol; 5 parts
Water; 85 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 4 were obtained.

Example 14

C. I. Direct Red 23; 5 parts
Ammonium salt of p-chlorostyrene-maleic acid copolymer (molecular weight; 2,200, decarboxylation temperature; 300° C.); 5 parts
Diethylene glycol; 5 parts
Water; 85 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 4 were obtained.

Comparative Example 5

C. I. Direct Blue 17; 5 parts
Na salt of formalin condensate of naphthalenesulfonic acid (molecular weight; 20,000; 5 parts
Glycerin; 4 parts
Water; 86 parts The components listed above were mixed together for 12 hours by a ball mill. The resulting dispersion was filtered through a 5-micron filter to remove small dust and coarse particles, and an ink was thereby obtained. The obtained ink was then used to print with a commercially available Micro-Bubble Jet printer (Type No. BJ-550 supplied by Canon Inc.), and the results shown in Table 4 were obtained.

TABLE 4

| | Scorching and Sticking | Water Resistance | |
| --- | --- | --- | --- |
| | to Printing Head | Blotting | Rubbing-off |
| Examples | | | |
| 13 | Not observed | Not observed | Not observed |
| 14 | Not observed | Not observed | Not observed |
| Comparative Example | | | |
| 5 | Observed | Observed | Observed |

As clear from the results shown in Tables 1 to 4, the aqueous ink for ink jet recording in accordance with the present invention does not exhibit any scorching and sticking to the printing head. Also, the aqueous ink for ink jet recording in accordance with the present invention produces printed images having a high water resistance. Thus the objects of the present invention are sufficiently achieved by the aqueous ink for ink jet recording in accordance with the present invention. In particular, excellent advantages are obtained when the aqueous ink for ink jet recording in accordance with the present invention is used to print with a thermal jet type ink jet printer.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

What is claimed is:

1. An aqueous ink for ink jet recording comprising water, a dye and a polymeric compound which can undergo the decarboxylation reaction at a temperature of 150° to 500° C. and which has a molecular weight of 1,000 to 10,000, wherein the dye is an oil-soluble dye, a disperse dye, or a direct dye, and wherein the polymeric compound comprises the following recurring unit (I)

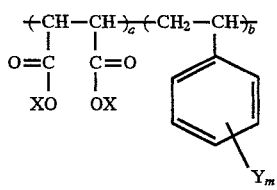 (I)

wherein X independently represents a hydrogen atom, an alkali metal ion, an ammonium ion, or a substituted or unsubstituted alkylamine; Y independently represents a substituted or unsubstituted alkyl group, a substituted or unsubstituted alkoxy group, a substituted or unsubstituted aryl group, a substituted or unsubstituted aryloxy group, a carboxyl group, an acyl group, a hydroxyl group, an amino group, a nitro group, a sulfonyl group, a sulfinyl group, or a halogen atom; and m represents an integer of 0 to 5.

2. An ink jet recording method comprising jetting an aqueous ink for ink jet recording according to claim 1 in a droplet form from a nozzle to a recording medium by the action of thermal energy, thereby producing an image on the recording medium.

3. The ink jet recording method according to claim 2, wherein a heating resistor element is used as a source of the thermal energy.

4. A method for ink jet recording comprising applying the aqueous ink of claim 1 to a recording medium.

* * * * *